US007267315B2

(12) United States Patent
Chen

(10) Patent No.: US 7,267,315 B2
(45) Date of Patent: Sep. 11, 2007

(54) ASSEMBLED TYPE OF DISPLAY APPARATUS

(75) Inventor: Chi-Fu Chen, Taipei (TW)

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 241 days.

(21) Appl. No.: 11/212,634

(22) Filed: Aug. 29, 2005

(65) Prior Publication Data

US 2007/0045505 A1    Mar. 1, 2007

(51) Int. Cl.
*A47G 29/00* (2006.01)
(52) U.S. Cl. .................. 248/346.01; 248/558; 248/917; 361/681
(58) Field of Classification Search ................ 248/678, 248/121, 224.8, 222.41, 225.11, 225.21, 346.01, 248/917, 222.11, 221.12, 558; 361/681, 361/683
See application file for complete search history.

(56) References Cited

U.S. PATENT DOCUMENTS

| 4,858,878 | A | * | 8/1989 | Gassaway | ................... 248/551 |
| 4,878,645 | A | * | 11/1989 | O'Neill | ....................... 248/680 |
| 5,209,445 | A | * | 5/1993 | Bergetz | ....................... 248/551 |
| 5,738,020 | A | * | 4/1998 | Correia | ......................... 109/51 |
| 6,123,314 | A | * | 9/2000 | Steele | ......................... 248/681 |
| 6,347,439 | B1 | * | 2/2002 | Bach Lahor | ..................... 27/1 |
| 6,740,851 | B2 | * | 5/2004 | Woodlief et al. | ........... 219/421 |
| 6,806,425 | B1 | * | 10/2004 | O'Neill | ....................... 174/66 |
| 6,941,469 | B2 | * | 9/2005 | Beuchat et al. | ............... 726/34 |

* cited by examiner

*Primary Examiner*—Anita M. King
(74) *Attorney, Agent, or Firm*—Rosenberg, Klein & Lee

(57) ABSTRACT

An assembled type of display apparatus has a base and a display body. The base has a plurality of positioning posts and a resilient latching member. The display body has an outer casing. The outer casing forms a plurality of first positioning and guiding holes and a plurality of second positioning and guiding holes in a circumferential face and a rear face thereof, respectively. When the circumferential face of the outer casing is connected to the base, each of the positioning posts is retained in the corresponding first positioning and guiding hole, and the resilient latching member latches onto the outer casing. When the rear face of the outer casing is connected to the base, each of the positioning posts is retained in the corresponding second positioning and guiding hole, and the resilient latching member latches onto the outer casing.

11 Claims, 9 Drawing Sheets

ASSEMBLED TYPE OF DISPLAY APPARATUS

BACKGROUND OF THE INVENTION

1. Field of the Invention

The present invention relates to an assembled type of display apparatus, and more particularly, to both a stand type and a wall-mounted type of an assembled type of display apparatus.

2. Background of the Invention

Display apparatuses are very commonly used with display apparatuses for desktop computers, LCD televisions, plasma televisions, etc. Types of display apparatuses include a stand type that is placed on a desk, and a wall-mounted type that is mounted on a wall.

A conventional display apparatus includes a base and a display body. The bottom face of the display body is fixed on the base via fastening elements such as screws to form a stand type of display apparatus. The stand type of display apparatus is assembled before leaving the factory.

The volume of the package of the above conventional stand type of display apparatus is large, causing high transportation costs to be incurred. Furthermore, the fastening elements detract from the overall appearance of the display apparatus.

In addition, if a user wants to change from a stand type of display apparatus to a wall-mounted type of display apparatus, he or she has to purchase additional adaptive components. Moreover, detaching the base and the display body and the assembly of the adaptive components are complicated, and the user must own the appropriate tools to complete the work.

SUMMARY OF INVENTION

The primary object of the invention is therefore to specify an assembled type of display apparatus which makes detaching and assembling a base and a display body thereof simple, the volume of the package thereof is reduced, the cost of components thereof is reduced, and the overall appearance thereof is improved, and enabling it to become both a stand type and a wall-mounted type of an assembled type of display apparatus.

According to the invention, the object is achieved via an assembled type of display apparatus comprising a base and a display body. The base has a plurality of positioning posts and a resilient latching member. The display body has an outer casing. The outer casing forms a plurality of first positioning and guiding holes in a circumferential face thereof. The outer casing forms a plurality of second positioning and guiding holes in a rear face thereof. The circumferential face and the rear face are selectively connected to the base. When the circumferential face of the outer casing is connected to the base, each of the positioning posts is retained in the corresponding first positioning and guiding hole, and the resilient latching member latches onto the outer casing. When the rear face of the outer casing is connected to the base, each of the positioning posts is retained in the corresponding second positioning and guiding hole, and the resilient latching member latches onto the outer casing.

The positioning posts of the base are selectively retained in the first positioning and guiding holes or the second positioning and guiding holes of the outer casing, and the resilient latching member of the base latches onto the outer casing, so that detaching and assembling the base and the display body are simple, the volume of the package thereof is reduced, the cost of components thereof is reduced, and the overall appearance thereof is improved, and the assembled type of display apparatus enables either a stand type or a wall-mounted type of display apparatus to be available to the user.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention which will be described hereinafter and which will form the subject of the claims appended hereto.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE EMBODIMENTS

Figure 1:
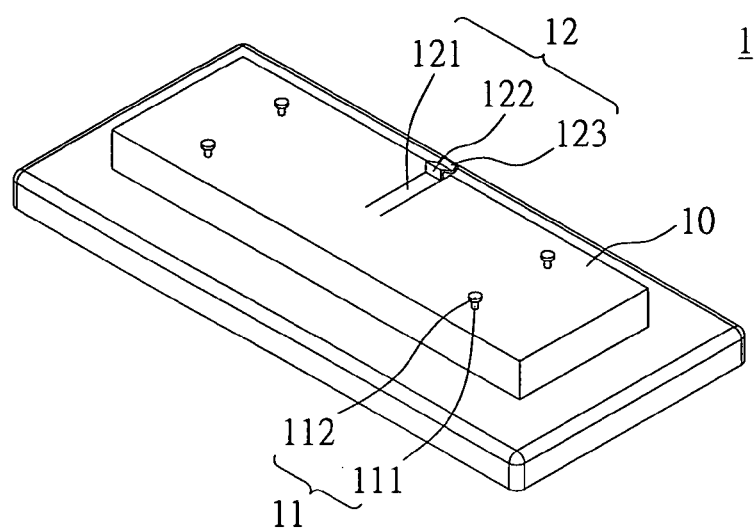
FIG. 1 is a perspective view of a base of an assembled type of display apparatus of the present invention.
Figure 2:
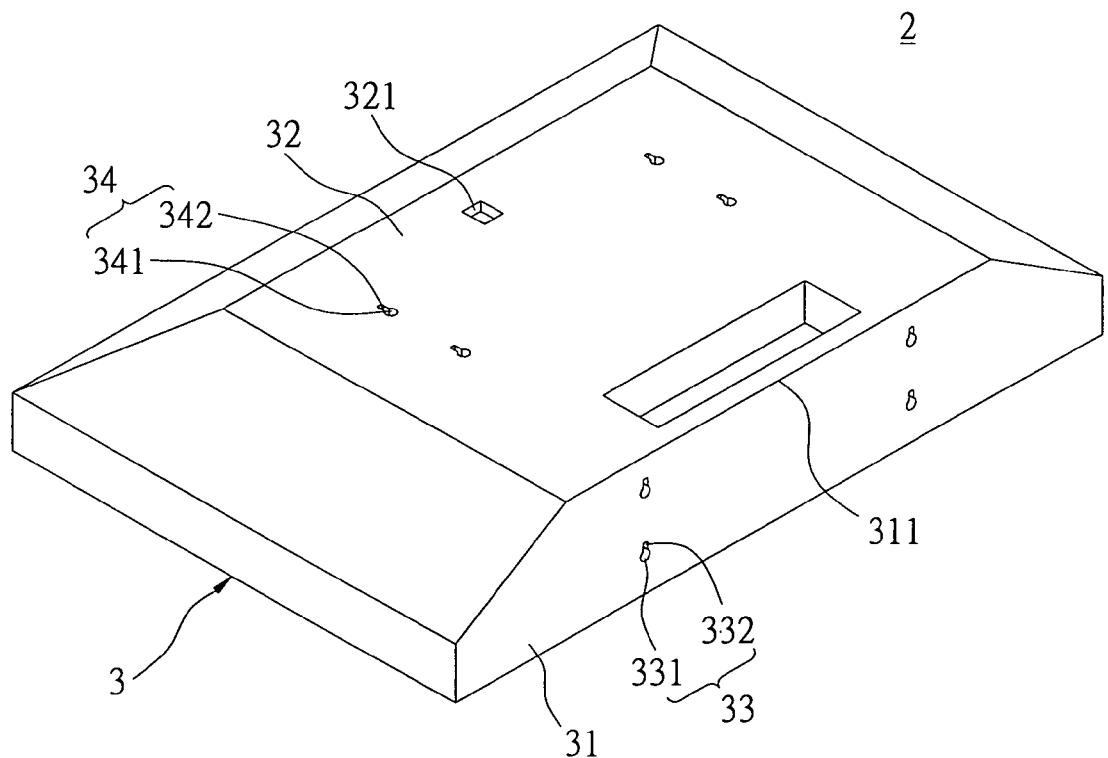
FIG. 2 is a perspective view of a display body of an assembled type of display apparatus of the present invention.

Referring to FIG. 1 and FIG. 2, the present invention provides an assembled type of display apparatus comprising a base 1 and a display body 2.

The base 1 has a plurality of positioning posts 11 and a resilient latching member 12 disposed at a top face 10 thereof. Each of the positioning posts 11 has a rod portion 111 and a protrusion 112. The protrusion 112 of each of the positioning posts 11 is connected to a distal end of the rod portion 111 thereof, and the protrusion 112 of each of the positioning posts 11 has a transversal cross-sectional area larger than that of the rod portion 111 thereof. The resilient latching member 12 has a resilient arm 121 and a latching portion 122, and the latching portion 122 is connected to a free end of the resilient arm 121. The resilient latching member 12 further has a pull portion 123, and the pull portion 123 is connected to the latching portion 122.

Figure 3:
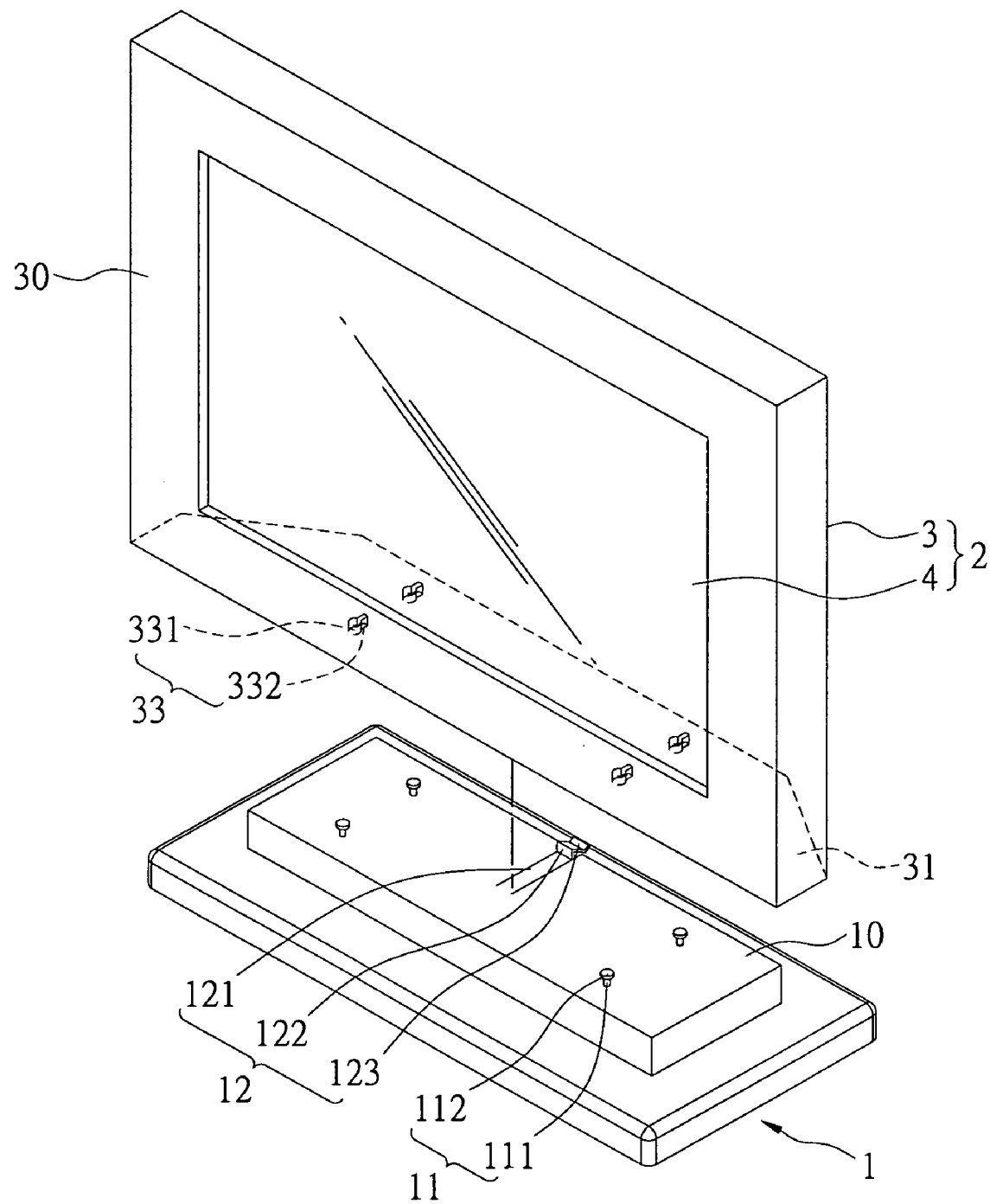
FIG. 3 is an exploded perspective view of an assembled type of display apparatus of the present invention, in which the circumferential face of the outer casing of the display body of the assembled type of display apparatus has not been connected to the base of the assembled type of display apparatus.
Figure 4:
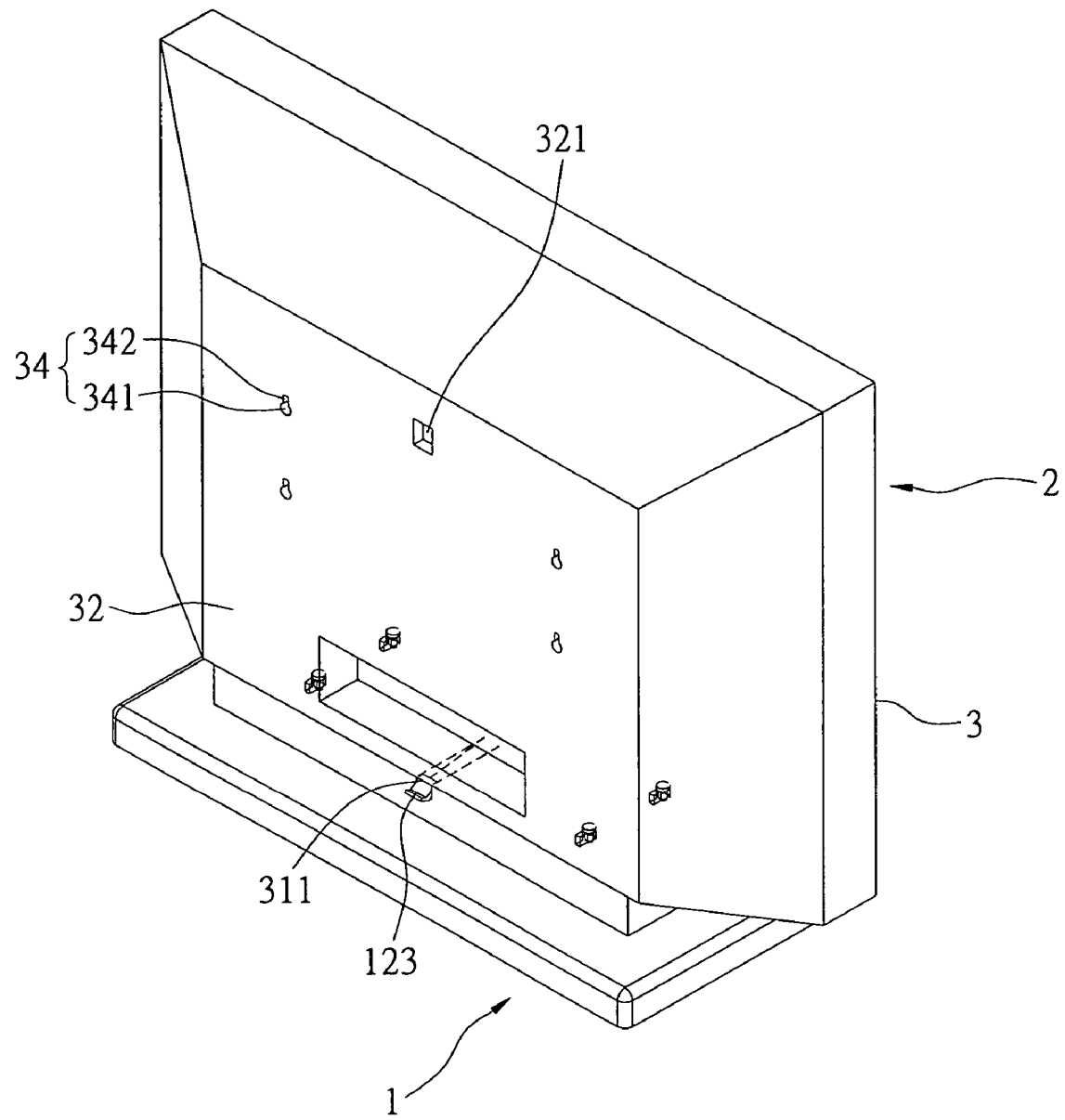
FIG. 4 is an assembled perspective view of an assembled type of display apparatus of the present invention, in which the resilient latching member of the base of the assembled type of display apparatus has not been latched onto the outer casing of the display body.
Figure 5:
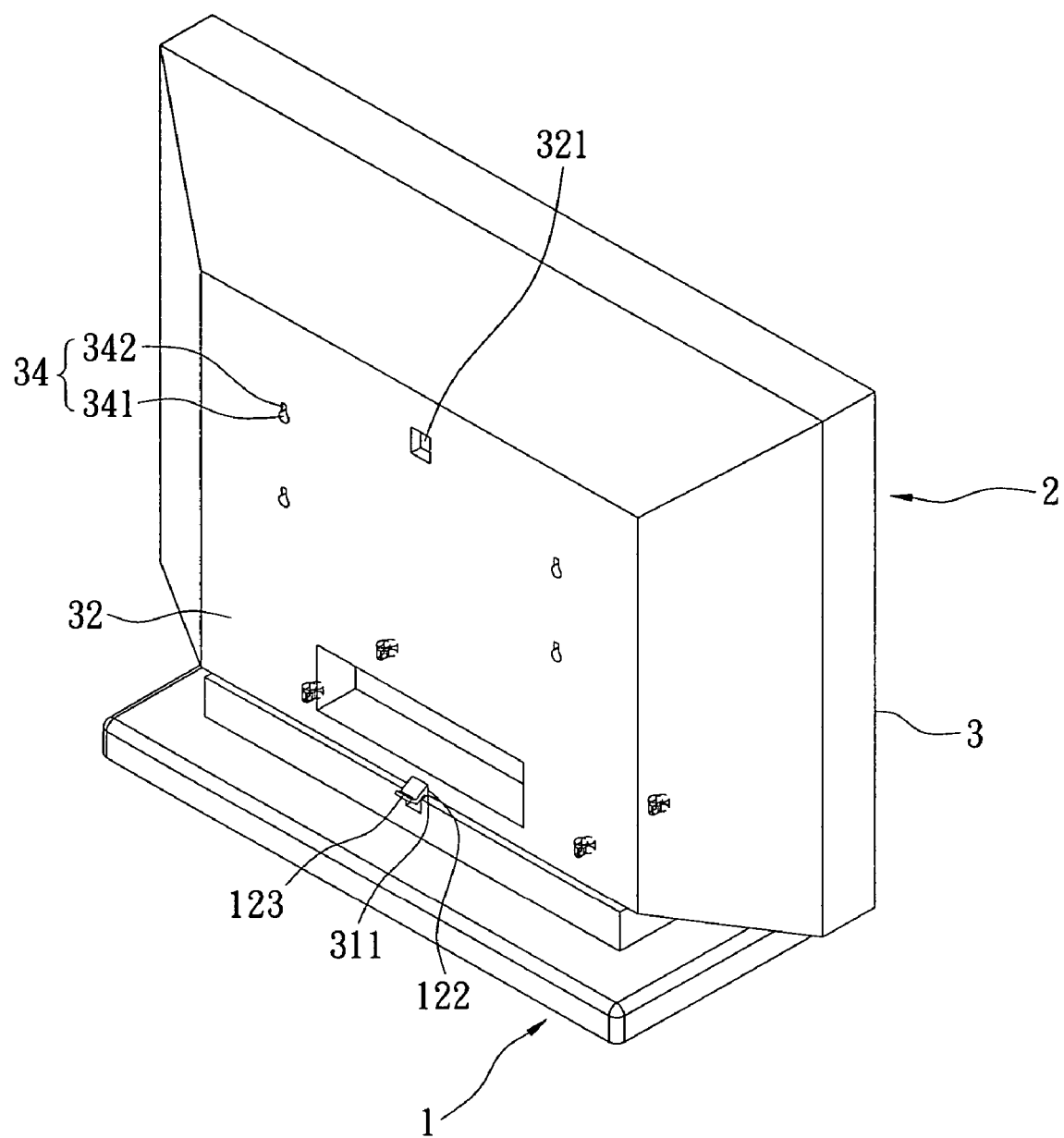
FIG. 5 is an assembled perspective view of an assembled type of display apparatus of the present invention, in which the resilient latching member of the base of the assembled type of display apparatus has been latched onto the outer casing of the display body.
Figure 6:
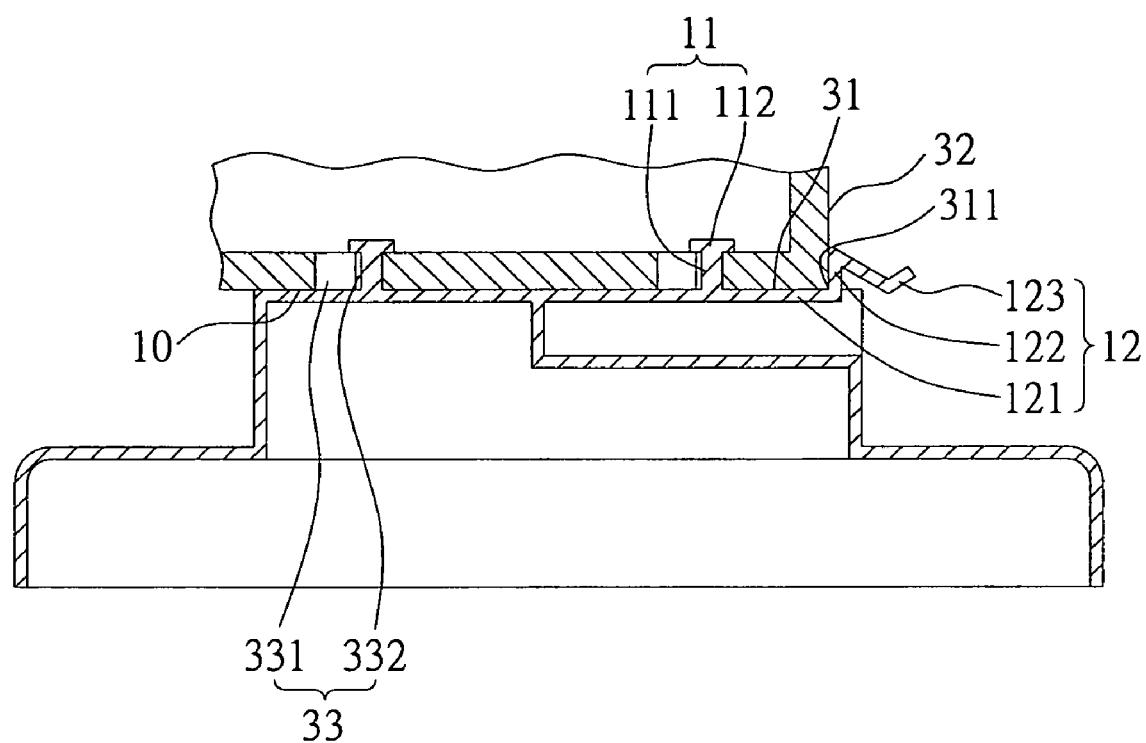
FIG. 6 is a schematic partial cross-sectional view of FIG. 5.
Figure 7:
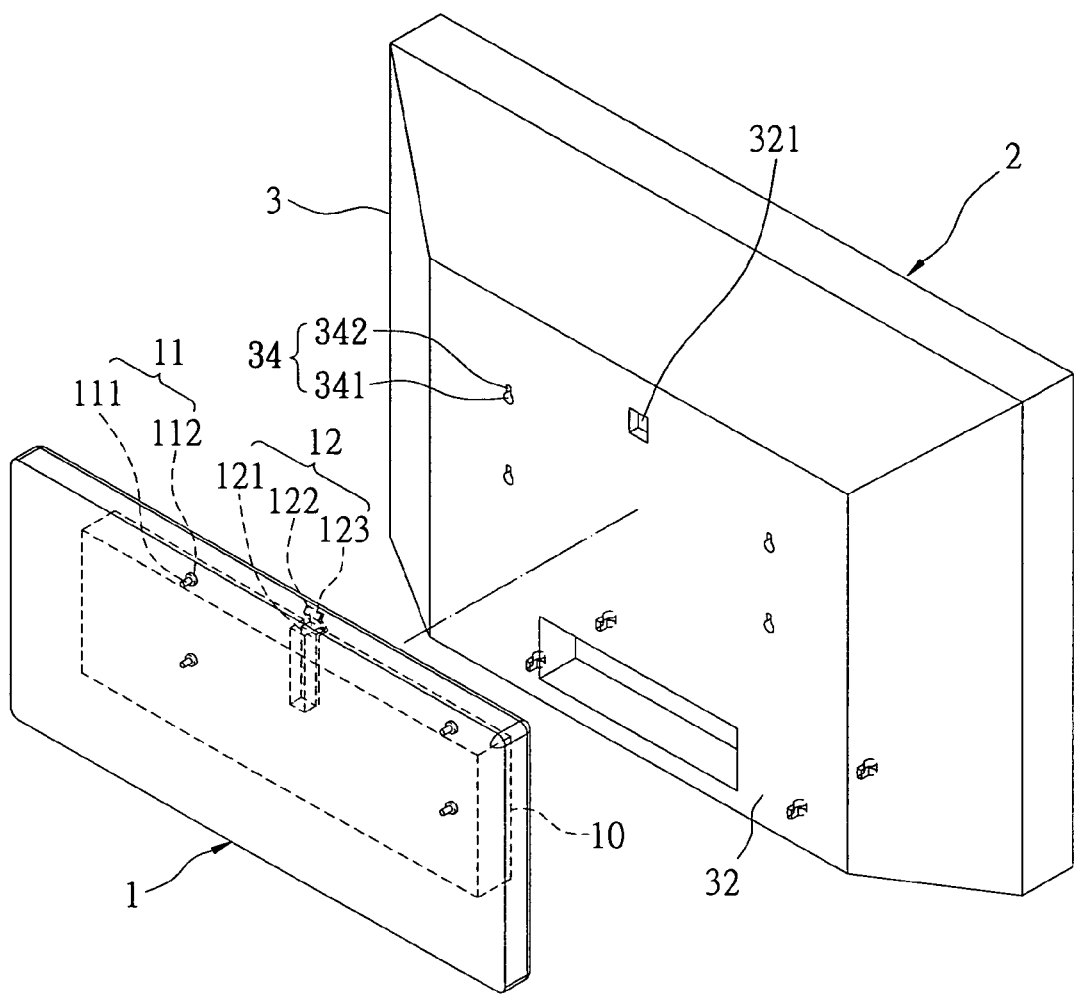
FIG. 7 is an exploded perspective view of an assembled type of display apparatus of the present invention, in which the rear face of the outer casing of the display body of the assembled type of display apparatus has not been connected to the base of the assembled type of display apparatus.
Figure 8:
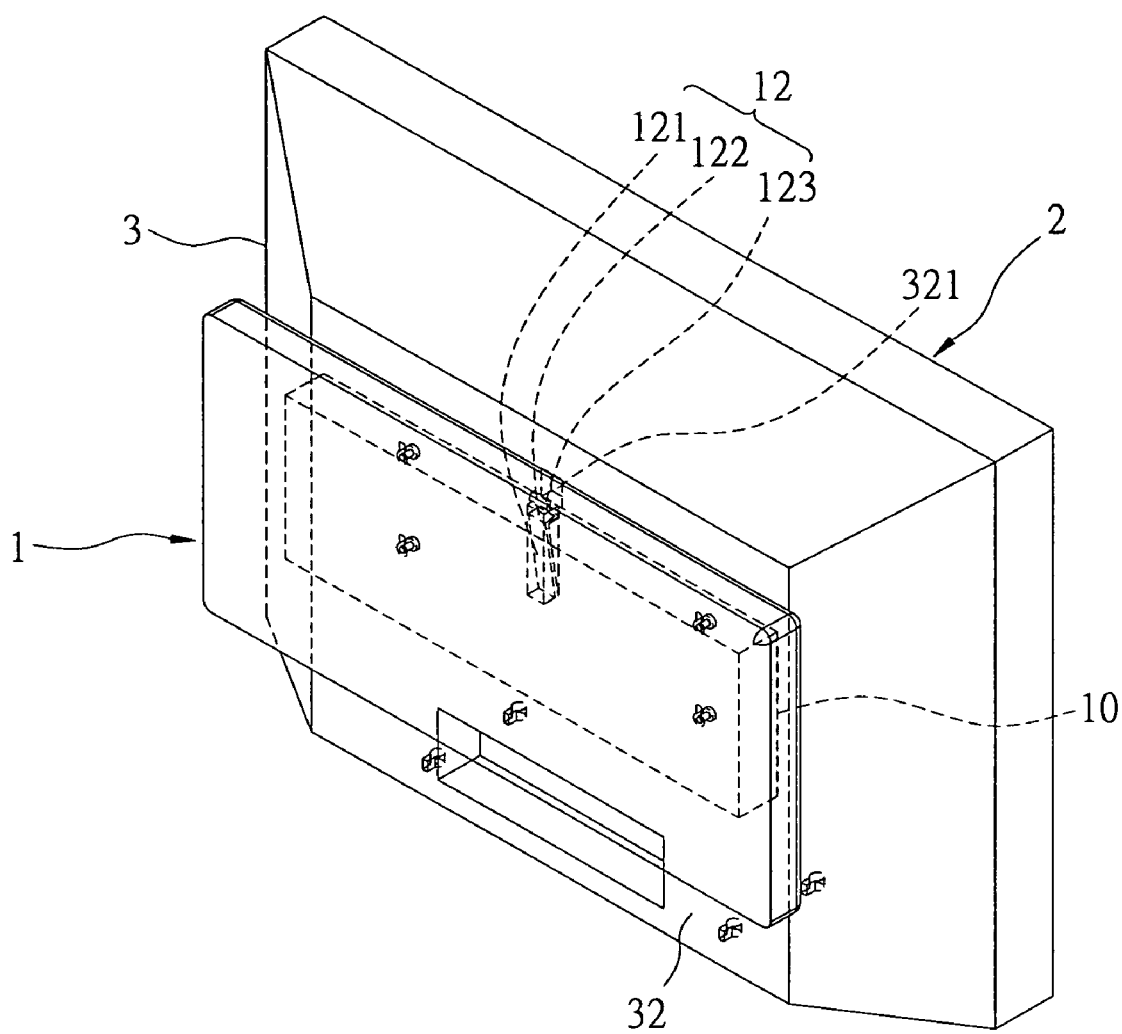
FIG. 8 is an assembled perspective view of an assembled type of display apparatus of the present invention, in which the resilient latching member of the base of the assembled type of display apparatus has not been latched onto the outer casing of the display body.
Figure 9:
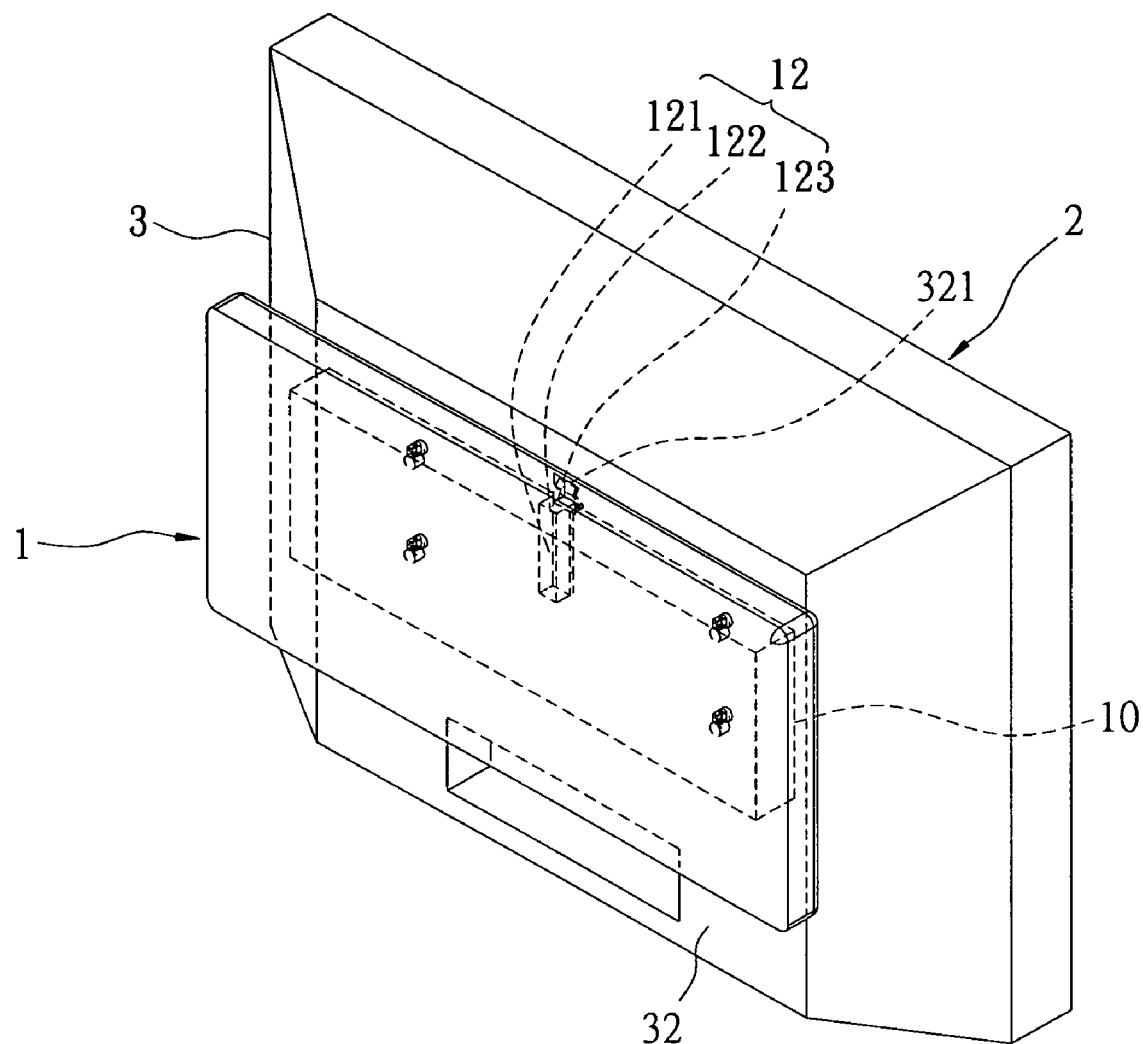
FIG. 9 is an assembled perspective view of an assembled type of display apparatus of the present invention, in which the resilient latching member of the base of the assembled type of display apparatus has been latched onto the outer casing of the display body.
Figure 10:
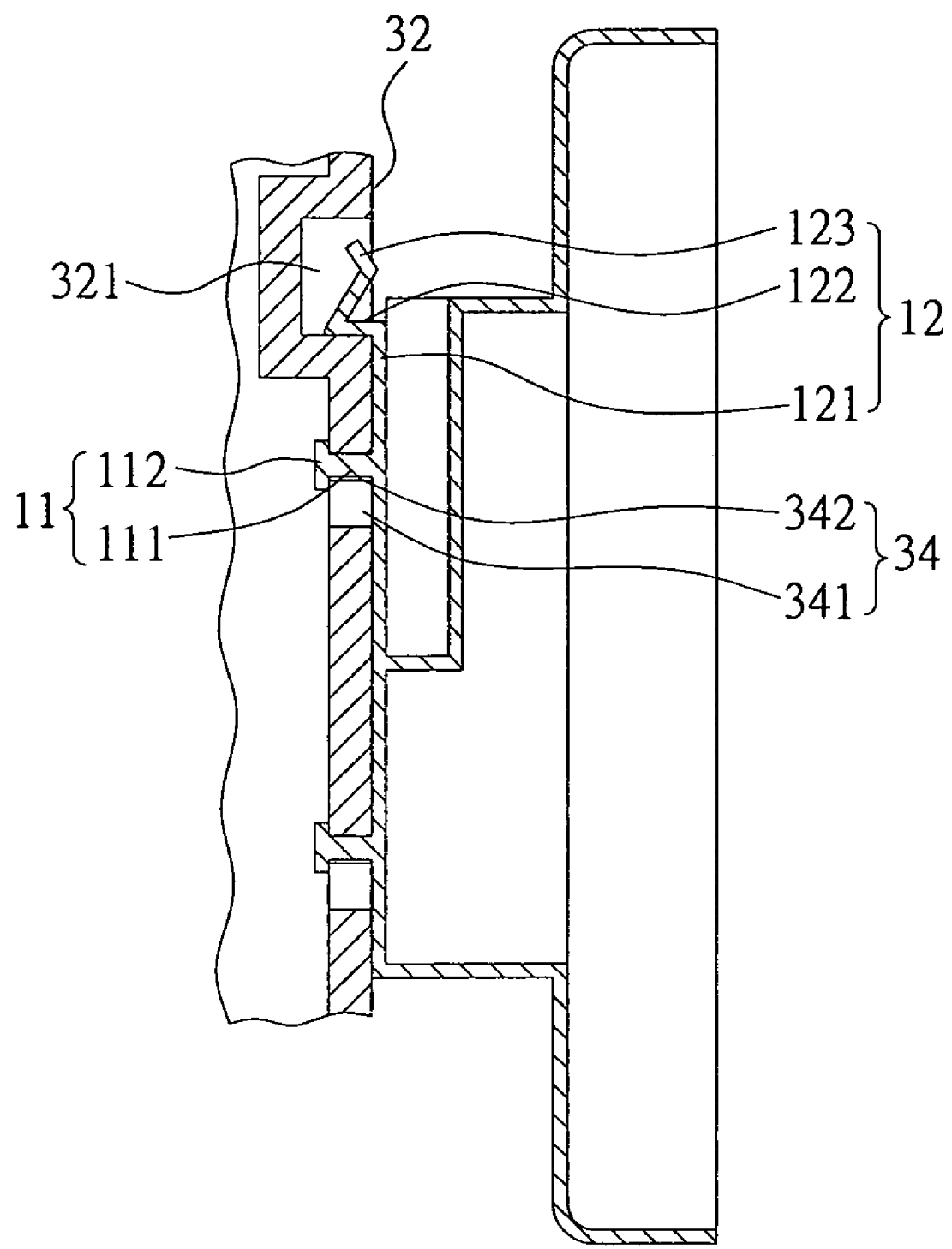
FIG. 10 is a schematic partial cross-sectional view of FIG. 9.

The display body 2 has an outer casing 3 and a display panel 4. The display panel 4 is disposed at a front face 30 of the outer casing 3 (See FIG. 3 and FIG. 4), and a circumferential face 31 and a rear face 32 of the outer casing 3 are selectively connected to the top face 10 of the base 1.

The outer casing 3 forms a plurality of first positioning and guiding holes 33 in the circumferential face 31 thereof. In this embodiment, the circumferential face 31 is a bottom face of the outer casing 3. Each of the first positioning and guiding holes 33 has an inserting portion 331 and a guiding portion 332. The transversal cross-sectional area of the inserting portion 331 and the transversal cross-sectional area of the guiding portion 332 of each of the first positioning and guiding holes 33 respectively match the transversal cross-sectional area of the protrusion 112 and the transversal cross-sectional area of the rod portion 111 of the corresponding positioning post 11. The outer casing 3 forms a plurality of second positioning and guiding holes 34 in the rear face 32 thereof. Each of the second positioning and guiding holes 34 has an inserting portion 341 and a guiding portion 342. The transversal cross-sectional area of the inserting portion 341 and the transversal cross-sectional area of the guiding portion 342 of each of the second positioning and guiding holes 34 respectively match the transversal cross-sectional area of the protrusion 112 and the transversal cross-sectional area of the rod portion 111 of the corresponding positioning post 11.

Reference is made to FIG. 2, the outer casing 3 defines a first latching position 311 and a second latching position 321. In this embodiment, the first latching position 311 is defined at an edge of the circumferential face 31 of the outer casing 3, the outer casing 3 has a recess formed in the rear face 32 thereof, and the second latching position 321 is defined at the recess. The guiding portion 332 of each of the first positioning and guiding holes 33 is closer to the first latching position 311 than the inserting portion 331 thereof is, and the guiding portion 342 of each of the second positioning and guiding holes 34 is closer to the second latching position 321 than the inserting portion 341 thereof is. The first latching position 311 and the second latching position 321 of the outer casing 3 may be another proper structure corresponding to the resilient latching member 12 of the base 1.

Referring to FIGS. 3-6, when the circumferential face 31 of the outer casing 3 (the bottom face of the outer casing 3) is connected to the base 1, the assembled type of display apparatus of the present invention becomes a stand type of display apparatus.

To attach the assembled type of display apparatus of the present invention to form a stand, the base 1 is firstly placed on a plane, and the inserting portion 331 of each of the first positioning and guiding holes 33 of the outer casing 3 are aligned with the protrusion 112 of the corresponding positioning post 11 of the base 1.

Next, the circumferential face 31 of the outer casing 3 abuts against the top face 10 of the base 1, so that the protrusion 112 of each of the positioning posts 11 is inserted into the inserting portion 331 of the corresponding first positioning and guiding hole 33. Meanwhile, the latching portion 122 of the resilient latching member 12 is depressed by the circumferential face 31 of the outer casing 3.

Next, the display body 2 is pushed forwardly, so that the rod portion 111 of each of the positioning posts 11 is guided into the guiding portion 332 of the corresponding first positioning and guiding hole 33, and the latching portion 122 of the resilient latching member 12 returns to the first latching position 311 (the edge of the circumferential face 31). As a result, each of the positioning posts 11 is retained in the corresponding first positioning and guiding hole 33, and the latching portion 122 of the resilient latching member 12 latches onto the first latching position 311 of the outer casing 3, so that the base 1 and the display body 2 are reliably connected to each other.

To detach the assembled type of display apparatus of the present invention, the pull portion 123 of the resilient latching member 12 is firstly pulled, so that the latching portion 122 is separated from the first latching position 311. Next, the display body 2 is pushed backwardly, so that the inserting portion 331 of each of the first positioning and guiding holes 33 aligns with the protrusion 112 of the corresponding positioning post 11. Next, the protrusion 112 of each of the positioning posts 11 is moved away from the inserting portion 331 of the corresponding first positioning and guiding hole 33, so that the circumferential face 31 of the outer casing 3 is separated from the top face 10 of the base 1.

Referring to FIGS. 7-10, when the rear face 32 of the outer casing 3 is connected to the base 1, the assembled type of display apparatus of the present invention becomes a wall-mounted type of display apparatus.

To attach the assembled type of display apparatus of the present invention so that it becomes a wall-mounted type, the base 1 is firstly fixed onto a wall, and the inserting portion 341 of each of the second positioning and guiding holes 34 of the outer casing 3 are aligned with the protrusion 112 of the corresponding positioning post 11 of the base 1.

Next, the rear face 32 of the outer casing 3 abuts against the top face 10 of the base 1, so that the protrusion 112 of each of the positioning posts 11 is inserted into the inserting portion 341 of the corresponding second positioning and guiding hole 34. Meanwhile, the latching portion 122 of the resilient latching member 12 is depressed by the rear face 32 of the outer casing 3.

Next, the display body 2 is pushed downwardly, so that the rod portion 111 of each of the positioning posts 11 is guided into the guiding portion 342 of the corresponding second positioning and guiding hole 34, and the latching portion 122 of the resilient latching member 12 returns to the second latching position 321 (the recess). As a result, each of the positioning posts 11 is retained in the corresponding second positioning and guiding hole 34, and the latching portion 122 of the resilient latching member 12 latches onto the second latching position 321 of the outer casing 3, so that the base 1 and the display body 2 are reliably connected to each other.

To detach the assembled type of display apparatus of the present invention, the pull portion 123 of the resilient latching member 12 is firstly pulled, so that the latching portion 122 is separated from the second latching position 321. Next, the display body 2 is pushed upwardly, so that the inserting portion 341 of each of the second positioning and guiding holes 34 aligns with the protrusion 112 of the corresponding positioning post 11. Next, the protrusion 112 of each of the positioning posts 11 is moved away from the inserting portion 341 of the corresponding second positioning and guiding hole 34, so that the rear face 32 of the outer casing 3 is separated from the top face 10 of the base 1.

According to the above description, detaching and assembling the base 1 and the display body 2 are very simple. The user is capable of detaching and assembling the apparatus without using any tools. Therefore, the base 1 and the display body 2 do not have to be assembled before leaving the factory. They can be packed into a separated status to reduce the volume of the package thereof. In addition, the assembled type of display apparatus of the present invention does not have any additional fasteners, so that the cost of components thereof is reduced, and the overall appearance thereof is improved.

As indicated above, the assembled type of display apparatus of the present invention has the following advantages:

1. The positioning posts of the base are selectively retained in the first positioning and guiding holes or the second positioning and guiding holes of the outer casing, and the resilient latching member of the base latches onto the outer casing, so that detaching and assembling the base and the display body are simple and the volume of the package thereof is reduced, so that transportation costs are reduced.

2. The positioning posts of the base match the first positioning and guiding holes and the second positioning and guiding holes, so that the circumferential face and the rear face of the outer casing of the display body are selectively connected to the base, so that the assembled type of display apparatus of the present invention becomes both a stand type and a wall-mounted type of display apparatus.

3. Instead of using additional fastening elements, the assembled type of display apparatus of the present invention uses the structure of the positioning posts, the resilient latching member, and the positioning and guiding holes to assemble the base and the display body, so that the cost of components thereof is reduced, and the overall appearance thereof is improved.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An assembled type of display apparatus comprising:
   a base having a plurality of positioning posts and a resilient latching member; and
   a display body having an outer casing, the outer casing forming a plurality of first positioning and guiding holes in a circumferential face thereof, the outer casing forming a plurality of second positioning and guiding holes in a rear face thereof, and the circumferential face and the rear face being selectively connected to the base; wherein
   when the circumferential face of the outer casing is connected to the base, each of the positioning posts is retained in the corresponding first positioning and guiding hole, and the resilient latching member latches onto the outer casing, and when the rear face of the outer casing is connected to the base, each of the positioning posts is retained in the corresponding second positioning and guiding hole, and the resilient latching member latches onto the outer casing.

2. The assembled type of display apparatus as claimed in claim 1, wherein each of the positioning posts of the base has a rod portion and a protrusion, the protrusion of each of the positioning posts is connected to a distal end of the rod portion thereof, and the protrusion of each of the positioning posts has a transversal cross-sectional area larger than that of the rod portion thereof.

3. The assembled type of display apparatus as claimed in claim 2, wherein each of the first positioning and guiding holes of the outer casing has an inserting portion and a guiding portion, and the transversal cross-sectional area of the inserting portion and the transversal cross-sectional area of the guiding portion of each of the first positioning and guiding holes respectively match the transversal cross-sectional area of the protrusion and the transversal cross-sectional area of the rod portion of the corresponding positioning post.

4. The assembled type of display apparatus as claimed in claim 3, wherein the outer casing defines a first latching position, the guiding portion of each of the first positioning and guiding holes is closer to the first latching position than the inserting portion thereof is, and when the circumferential face of the outer casing is connected to the base, the resilient latching member of the base latches onto the first latching position.

5. The assembled type of display apparatus as claimed in claim 4, wherein the first latching position of the outer casing is defined at an edge of the circumferential face.

6. The assembled type of display apparatus as claimed in claim 2, wherein each of the second positioning and guiding holes of the outer casing has an inserting portion and a guiding portion, and the transversal cross-sectional area of the inserting portion and the transversal cross-sectional area of the guiding portion of each of the second positioning and guiding holes respectively match the transversal cross-sectional area of the protrusion and the transversal cross-sectional area of the rod portion of the corresponding positioning post.

7. The assembled type of display apparatus as claimed in claim 6, wherein the outer casing defines a second latching position, the guiding portion of each of the second positioning and guiding holes is closer to the second latching position than the inserting portion thereof is, and when the rear face of the outer casing is connected to the base, the resilient latching member of the base latches onto the second latching position.

8. The assembled type of display apparatus as claimed in claim 7, wherein the outer casing has a recess formed in the rear face thereof, and the second latching position of the outer casing is defined at the recess.

9. The assembled type of display apparatus as claimed in claim 1, wherein the resilient latching member of the base has a resilient arm and a latching portion, and the latching portion is connected to a free end of the resilient arm.

10. The assembled type of display apparatus as claimed in claim 9, wherein the resilient latching member of the base has a pull portion, and the pull portion is connected to the latching portion.

11. The assembled type of display apparatus as claimed in claim 1, wherein the circumferential face of the outer casing is a bottom face of the outer casing.

* * * * *